(12) United States Patent
Dussauze et al.

(10) Patent No.: US 10,248,004 B2
(45) Date of Patent: Apr. 2, 2019

(54) METHOD FOR THE INSCRIPTION OF SECOND-ORDER NONLINEAR OPTICAL PROPERTIES INTO AN AMORPHOUS OR VITREOUS MATERIAL

(71) Applicants: UNIVERSITE DE BORDEAUX, Bordeaux (FR); INSTITUT POLYTECHNIQUE DE BORDEAUX, Talence (FR); CENTRE NATIONAL DE LA RECHERCHE SCIENTIFIQUE CNRS, Paris (FR)

(72) Inventors: Marc Gaston Joseph Henri Dussauze, Pessac (FR); Evelyne Claude Fargin, Gradignan (FR); Vincent Jean Paul Rodriguez, Cestas (FR); Thierry Cardinal, Salles (FR); Frédéric Robert Adamietz, Mérignac (FR)

(73) Assignees: UNIVERSITE DE BORDEAUX, Bordeaux (FR); INSTITUT POLYTECHNIQUE DE BORDEAUX, Talence (FR); CENTRE NATIONAL DE LA RECHERCHE SCIENTIFIQUE (CNRS), Paris (FR)

( * ) Notice: Subject to any disclaimer, the term of this patent is extended or adjusted under 35 U.S.C. 154(b) by 0 days.

(21) Appl. No.: 15/571,665

(22) PCT Filed: May 4, 2016

(86) PCT No.: PCT/EP2016/060071
§ 371 (c)(1),
(2) Date: Nov. 3, 2017

(87) PCT Pub. No.: WO2016/177818
PCT Pub. Date: Nov. 10, 2016

(65) Prior Publication Data
US 2018/0129117 A1    May 10, 2018

(30) Foreign Application Priority Data

May 5, 2015    (FR) .................................... 15 54015

(51) Int. Cl.
G02F 1/361    (2006.01)
G02F 1/355    (2006.01)
G02F 1/35     (2006.01)

(52) U.S. Cl.
CPC ............ G02F 1/3617 (2013.01); G02F 1/353 (2013.01); G02F 1/3555 (2013.01); G02F 1/3558 (2013.01)

(58) Field of Classification Search
CPC ...... G02F 1/353; G02F 1/3558; G02F 1/3617; G02F 1/3775
See application file for complete search history.

(56) References Cited

U.S. PATENT DOCUMENTS 5,262,890 A * 11/1993 Berkovic .............. G02F 1/3617
                                                    359/328
5,279,870 A *  1/1994 Kester .................... C08G 59/20
                                                    204/155

(Continued)

FOREIGN PATENT DOCUMENTS

WO    WO 90/08970 A1    8/1990

OTHER PUBLICATIONS

International Search Report as issued in International Patent Application No. PCT/EP2016/060071, dated Jul. 21, 2016.

(Continued)

*Primary Examiner* — Daniel Petkovsek
(74) *Attorney, Agent, or Firm* — Pillsbury Winthrop Shaw Pittman LLP

(57) ABSTRACT

A method for the inscription of second-order nonlinear optical properties on a support including an amorphous material, the method including: heating the support within a (Continued)

temperature range allowing the movement of charges inside the support; applying a structured electrode to the support, generating an electrical field designed to induce the formation of non-linear optical properties on the surface of the support; and cooling the support.

12 Claims, 6 Drawing Sheets

(56) References Cited

U.S. PATENT DOCUMENTS

| | | |
|---|---|---|
| 5,434,699 A | 7/1995 | Berkovic et al. |
| 6,555,293 B1 * | 4/2003 | Fejer ............... G02F 1/3558 257/432 |
| 6,581,414 B2 * | 6/2003 | Fujiwara ........... G02F 1/3555 65/33.1 |

OTHER PUBLICATIONS

Brunkov, P. N., et al., "Submicron-Resolved Relief Formation in Poled Glasses and Glass-Metal Nanocomposites," Technical Physics Letters, American Institute of Physics, vol. 34, No. 12, Dec. 2008, XP002718946, pp. 1030-1033.

Delestre, A., et al., "Towards second-harmonic generation micropatterning of glass surface," Applied Physics Letters, American Institute of Physics, vol. 96, No. 9, Mar. 2010, XP012132388, pp. 91908-1-91908-3.

Margulis, W., et al,. "Who needs a cathode? Creating a second-order nonlinearity by charging glass fiber with two anodes," Optics Express, Aug. 2009, XP055253261, Retrieved from the Internet: URL:<https://www.osapublishing.org/DirectPDFAccess/FAD35EDE-FF38-9A81-740C23205D174238_184861/oe-17-18-15534.pdf?da=1&id=184861&seq=0&mobile=no>, pp. 15534-15540.

Takagi, H., et al., "Electrostatic Imprint Process for Glass," Applied Physics Express 1, Feb. 2008, XP55287120, Retrieved from the Internet: URL: <doi:10.1143/APEX.1.024003, pp. 024003-1-024003-3.

* cited by examiner

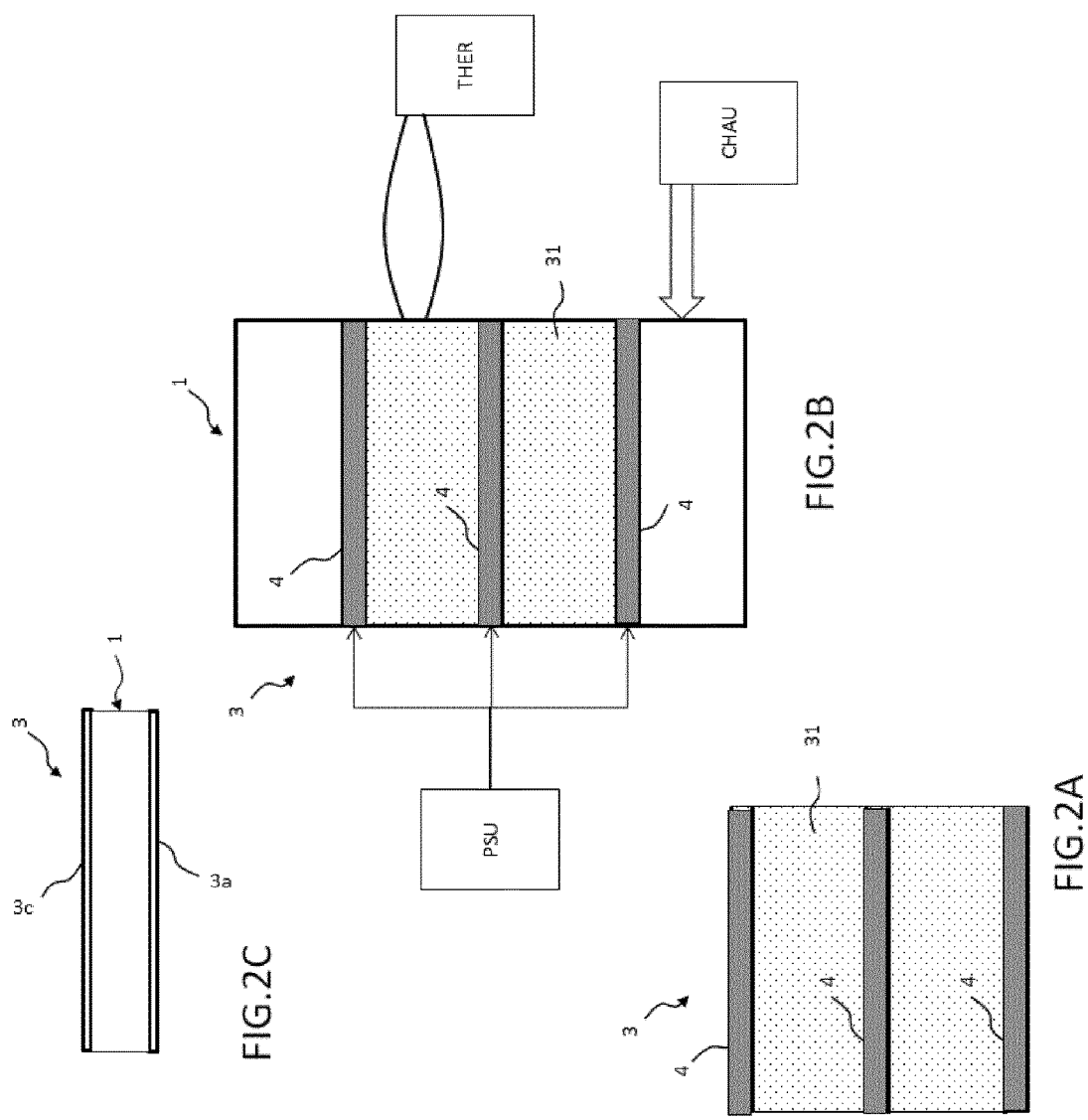

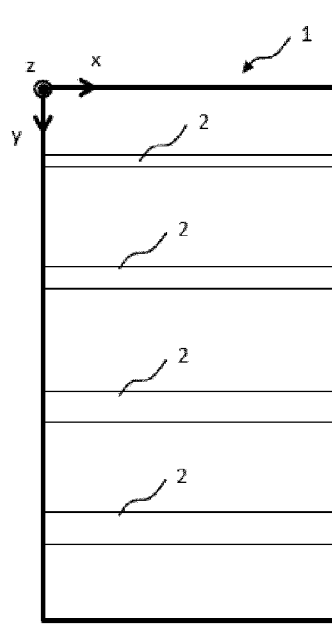
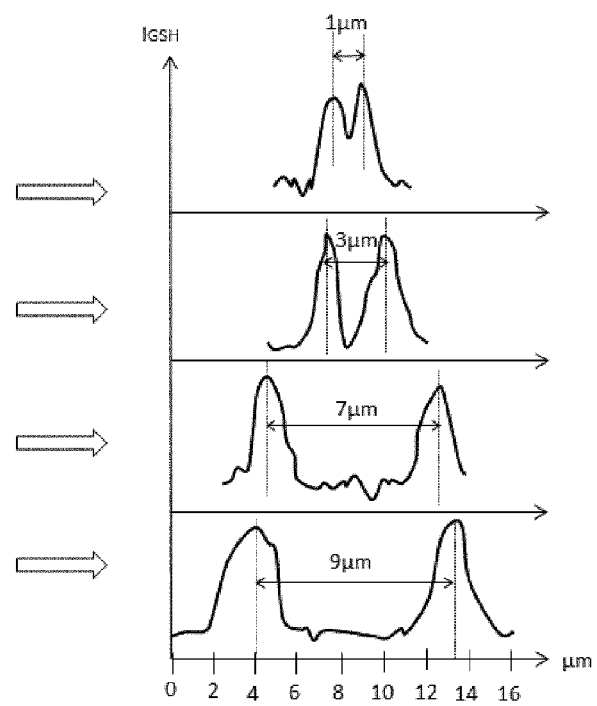
FIG.3A                    FIG.3B

METHOD FOR THE INSCRIPTION OF SECOND-ORDER NONLINEAR OPTICAL PROPERTIES INTO AN AMORPHOUS OR VITREOUS MATERIAL

CROSS-REFERENCE TO RELATED APPLICATIONS

This is the U.S. National Stage of PCT/EP2016/060071, filed May 4, 2016, which in turn claims priority to French Patent Application No. 1554015, filed May 5, 2015, the entire contents of all applications are incorporated herein by reference in their entireties.

FIELD

The field of the invention relates to methods for the inscription of second order non-linear optical properties on an amorphous material type support. The field of the invention pertains to the supports thereby inscribed and to the electrodes having a structuring allowing the production of non-linear optical effects on an amorphous material.

PRIOR ART

At present, solutions exist making it possible to inscribe non-linear optical properties on inorganic crystals. The latter include non-centrosymmetric crystalline dielectric materials, such as oxides of lithium niobate ($LiNbO_3$) or lithium tantalate ($LiTaO_3$) type as well as semiconductor materials such as GaS.

The main limits of the crystalline materials used at present concern the difficulty of implementing these materials which makes the manufacturing methods costly, as well as the optical losses of this type of system notably at the interfaces of the crystalline materials and glassy materials as is the case in implementations of optic fibres.

No solution exists making it possible to inscribe non-linear optical properties in a geometrically and spatially controlled manner on an amorphous material forming a support. Yet these latter materials are capable of offering good capacities for defining optical elements in different applications such as for example the manufacture of electro-optical elements or elements making it possible to frequency transpose an optical signal.

There thus exists a need to define a novel method for inscribing non-linear properties on an amorphous support.

SUMMARY OF THE INVENTION

The invention makes it possible to resolve the aforesaid drawbacks.

An object of the invention relates to a method for the inscription of second order non-linear optical properties on a support comprising an amorphous material. The method comprises:
   Heating the support within a temperature range allowing the movement of charges inside said support;
   Applying a structured electrode to said support generating an electrical field designed to induce the formation of non-linear optical properties on the surface of said support;
   Cooling the support.

According to one embodiment, said structured electrode induces a localised accumulation of electrical charges in at least one first zone of its surface when it is supplied, said localised accumulation of charges generating at least one anisotropy structuring a second zone of the support.

One object of the invention thus relates to a method for the inscription of second order non-linear optical properties on a support comprising an inorganic amorphous material characterised in that it comprises:
   Heating the support within a temperature range allowing the movement of charges inside said support;
   Applying a structured electrode to said support generating an electrical field designed to induce a localised accumulation of electrical charges in at least one first zone of the surface of said structured electrode when it is supplied by a voltage, said localised accumulation of charges generating at least one anisotropy structuring a second zone of the support in the form of non-linear optical properties inscribed on the surface of said support;
   Cooling the support under the application of the electrical field generated for a determined duration by the application of the electrode.

Advantageously, an anisotropy formed in the support comprises a controlled geometry and localisation in the second zone of the support.

Advantageously, an anisotropy formed in the support is homogeneous along at least one direction of the second zone of the support.

According to one embodiment, the accumulation of charges is induced in at least one first zone of the surface of the electrode by one of the following effects:
   an edge effect;
   a peak effect;
   a confinement effect.

According to one embodiment, the structuring of the electrode is designed to create an anisotropy inducing a localised distribution of second order non-linear optical properties in the second zone of the support.

According to one embodiment, the first zone and/or the second zone comprise at least one dimension less than 100 µm.

According to one embodiment, the electrode comprises an electrically conducting material comprising at least one geometric discontinuity.

According to one embodiment, at least one geometric discontinuity is a confinement or a peak on the surface of the electrode.

According to one embodiment, the electrode comprises spatial alternations between at least one electrically conducting material and one electrically non-conducting material.

According to one embodiment, an edge effect is induced on at least one structured electrode comprising at least one junction between a conducting material and a non-conducting material.

According to one embodiment, the electrode comprises a thin layer of an electrical conductor superimposed on a layer of an insulating substrate.

According to one embodiment, the application of the structured electrode comprises maintaining the electrical field during cooling of the support. According to one embodiment, the application of the structured electrode comprises its being maintained in contact with the support for a predefined duration.

According to one embodiment, the material of the support comprises cations contributing to an ionic conduction of the support, the proportion of said cations being comprised between 0.0001% and 50% of the atoms of the support.

Another object of the invention relates to a structured electrode for the inscription of non-linear optical properties of an amorphous material comprising at least one conducting zone comprising geometric properties on its surface making it possible to generate a localised accumulation of electrical charges while it is supplied.

According to one embodiment, the electrode comprises a periodic structuring of conducting patterns, each conducting pattern forming a conducting zone.

According to one embodiment, the conducting patterns are spaced apart by at least one predefined dimension.

According to one embodiment, the geometric properties form an arrangement of geometric discontinuities comprising localised holes and peaks.

According to one embodiment, the electrode comprises spatial alternations of conducting and non-conducting zones forming the geometric properties.

Another object of the invention relates to an amorphous support comprising an anisotropy printed by a polarisation treatment using an electrode of the invention or the method of the invention, the anisotropy modifying the second order non-linear optical properties of the support in a localised manner.

According to one embodiment, the geometry of the anisotropy is controlled along at least one direction orthogonal to the plane of the surface of the support.

According to one embodiment, the geometry of the anisotropy is controlled along at least two directions orthogonal to each other and of which one is orthogonal to the plane of the surface of the support.

According to one embodiment, the amorphous support comprises a periodic distribution of anisotropies.

According to one embodiment, the anisotropy forms patterns that are structured and arranged to enable a frequency conversion of at least one incident optical signal of a given wavelength and passing through said support.

Another object of the invention relates to a method for structuring an electrode comprising:
 A deposition of a thin layer of an electronic conducting material on a layer of an electrically insulating substrate;
 An ablation of parts of the thin layer of the conducting material to form an alternation of at least one conducting zone and at least one non-conducting zone, at least one dimension of a conducting zone being less than 100 µm.

According to one embodiment, the alternation of conducting zones and non-conducting zones forms a set of lines.

BRIEF DESCRIPTION OF THE FIGURES

Other characteristics and advantages of the invention will become clear from reading the detailed description that follows, with reference to the appended figures, which illustrate:
FIGS. 2A, 2B, 2C: the main elements for the implementation of the inscription method of the invention;
FIG. 3A: an amorphous material forming a support printed from an electrode comprising lines of different widths;
FIG. 3B: different responses of a SHG signal as a function of the width of the structuring lines of a support of FIG. 3A.

DESCRIPTION

Figure 1:
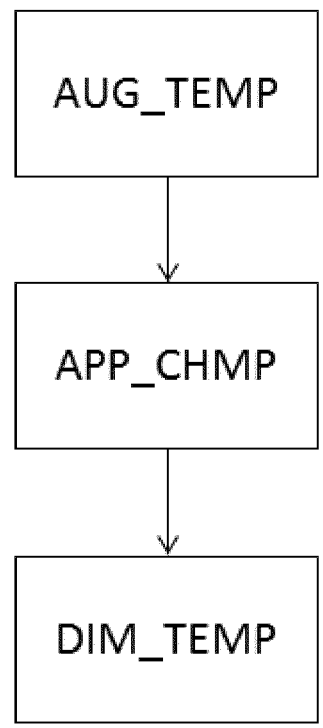
FIG. 1: the main steps of the inscription method of the invention.

In the present description, the expressions support made of amorphous material or amorphous support or amorphous material forming a support for the inscription are used indiscriminately.

One object of the invention relates to a method of spatially and/or geometrically controlled implementation of second order non-linear properties in an amorphous material forming a support. This implementation method is also considered as an inscription method or a method for printing second order non-linear optical properties on the support.

A "non-linear optical property" of a material refers to an optical property of the material which generates a non-linear response to the application of an applied electrical field E and thus also refers to a field of an electromagnetic wave and thus of a light wave. The material comprises a non-linear optical property when the response to a field E which is applied locally to the zone comprising the optical non-linear property is not proportional to E.

Finally, in the present description, an inscription on the surface of a support is evoked while considering that the inscription is carried out over a portion of the depth of the material. Given that the dimensions of inscription in depth of the material are negligible vis-à-vis the dimensions in the plane parallel to the surface of the support, the expression "inscription on the surface of the support" is commonly used. Nevertheless, at the micrometric level, the inscription is not carried out uniquely on the surface but within a volume of the material.

In the present description, a 'non-linear optical property" is considered a second order non-linear optical property. Different orders of non-linearity may take place during an inscription method of the invention, but the invention makes it possible notably to control geometrically and spatially the second order non-linear optical properties that are induced in an amorphous material.

Support

The method of the invention makes it possible to control the implementation of an anisotropy within an amorphous material. The controlled implementation of the anisotropy makes it possible, according to the method of the invention, to induce the creation of at least one second order non-linear optical property on the surface of the material. The anisotropy is implemented over a depth ranging from 100 nm to several tens of µm. The anisotropy is generated by the implementation of a space charge along a desired geometry. The anisotropy created on the surface of the support may comprise properties along one or different axes of the amorphous material.

The materials are amorphous materials such as for example glasses. These are then known as vitreous supports. More specifically, inorganic amorphous materials are particularly advantageous. "Inorganic material" is taken to mean any mineral type material. Consequently, the invention applies to mineral type amorphous supports, in other words to amorphous mineral materials.

According to one embodiment finding specific applications, glass type vitreous materials have an interest during the application of the method of the invention.

The material used to implement the invention is all the more interesting when its composition comprises cations contributing to ionic conduction. Among cations, it is possible to configure a composition of an amorphous material with, for example, $Li^+$, $Na^+$, $K^+$ and/or $Ca^{2+}$. The atomic proportion of these elements in the amorphous material may vary from several ppm to 20%. According to certain cases, the proportion of cations may be greater, ranging from 20% to 50%. However, the atomic proportion of cations in the amorphous material is designed to enable:

on the one hand, the creation of spatially and geometrically controlled non-linear optical properties and;
on the other hand, good mechanical aspect of the material for the desired use.

According to one embodiment, the support may be a glass slide of a millimeter thickness, the chemical formula of which comprises the following elements: Na, B, P, Nb and O. This support is called the test support.

More generally, the support may be any type of support of which the geometric shape is intended for a given application. For example, a thin layer of a thickness of several micrometers may be used to inscribe second order optical properties.

The method of the invention makes it possible to print non-linear optical properties over a depth ranging from several nanometers to at least ten or so micrometers. The method of the invention applies to any type of amorphous support and any type of surface. The geometric properties of the support are designed for a given application.

The support may be advantageously an optical element allowing the frequency conversion of an incident optical signal.

Type of Electrodes

The method of the invention is implemented by a structured electrode designed to generate localised accumulations of charges according to a predefined spatial and geometric arrangement. The process of accumulation of charges is controlled by the nature and the structuring of the electrode, the duration and the intensity of the field or the electrical potential applied.

According to different embodiments, the electrode 3 may be structured in different ways. It may be structured by the presence of confinements (holes), the presence of peaks or by a structuring comprising edges or by a combination of these different geometries. When a voltage is applied to the electrode, an electrical field is produced. The structuring of the electrode induces a modification of the electrical field produced on its surface according to the distribution and the geometry of the structuring of the electrode. The shape of the electrical field produced results from the effects produced by the confinement effect, the peak effect or the edge effect or a combination of these effects. The electrons accumulate, for example, on the edges of a specific structuring. The structuring of an electrode on its surface makes it possible to control a desired accumulation of charges to induce second order non-linear optical properties on the support made of amorphous material.

The confinement effect may be obtained by the formation of at least one hole localised on the surface of the conducting zone of the electrode. The peak effect may be obtained by the formation of a conducting peak on the surface of the conducting zone of the electrode.

According to one embodiment, the electrode 3 comprises a set of confinement points and/or a set of points forming peaks arranged on the surface of the conducting zone. The arrangement may be produced so as to form a matrix of points or a given geometric pattern. For example, an alternation of confinement points and peaks may be defined on the surface of the electrode 3. In this case, the spacings between the points of surface discontinuity of the conducting zone of the electrode are defined according to a given optical application of the amorphous support.

According to one embodiment, the electrode comprises a conducting material having geometric discontinuities on its surface.

According to another embodiment, the electrode comprises spatial alternations of its electrical conduction properties. For example, the electrode 3 may comprise a geometric alternation of conducting zones and non-conducting zones on a portion 4 which is intended to be applied on the support 1. In order to produce such a spatial alternation while benefiting from the edge effect produced, conducting zones may be superimposed in part on an insulating substrate.

This type of structuring for the preparation of an electrode may be obtained by lithography type techniques commonly used in microelectronics.

FIG. 2A represent an exemplary embodiment of an electrode 3 and an alternation of structured lines 4 on the surface of the anode of the electrode 3. According to the envisaged embodiments, the electrode 3 may comprise a frame to maintain the anode for example on a support. The lines are structured by superimposition of conducting lines on an insulating substrate 31. To facilitate the reading of the figure and the visibility of the lines, the latter are represented in a visible manner in a top view of the electrode 3. This representation is also conserved in FIG. 2B.

FIG. 2C represent the electrode 3 in sectional view, in which may be distinguished the part forming the cathode 3c and the part forming the anode 3a arranged facing each other. In this example, the electrode 3 forms a sandwich structure in which the support 1 may be maintained between the anode 3a and the cathode 3c.

Figure 6A:
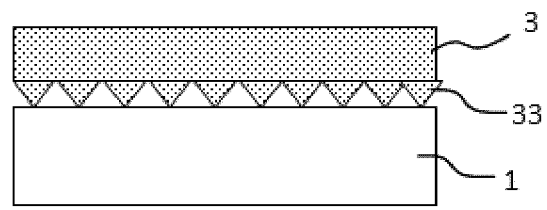
FIGS. 6A, 6B: two exemplary embodiments of electrodes of the invention.

FIG. 6A represents another exemplary embodiment of an electrode 3 comprising peaks 33 that form the structuring of the electrode 3. The electrode 3 may comprise in this example a doped silicon wafer forming a conducting element.

Figure 6B:
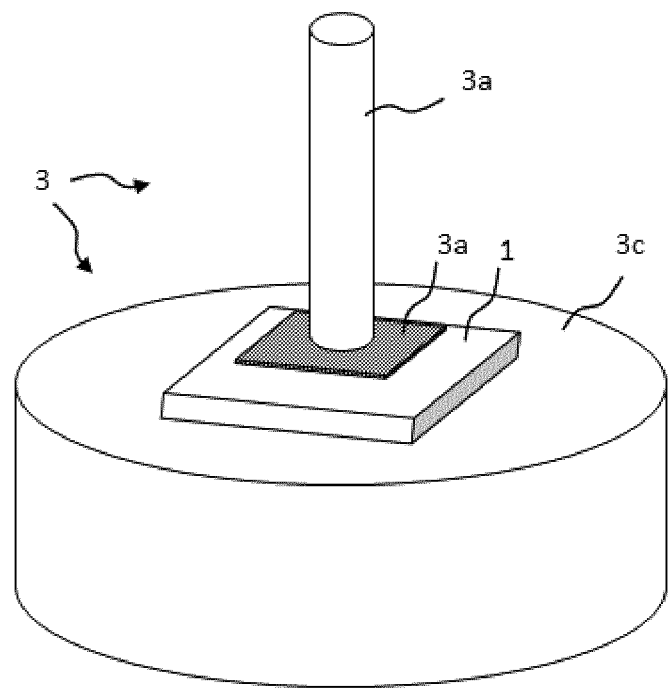

FIG. 6B represents another exemplary embodiment of an electrode 3. The latter comprises an anode 3a prolonged by a conducting element of thin silicon wafer type affixed onto a support 1. The electrode 3 comprises, in this example, a cathode 3c on which the support 1 rests. The structuring of the anode 3a may be, for example, a structuring comprising lines as represented in FIG. 2A or a structuring comprising peaks as represented in FIG. 6A. According to one embodiment, the cathode 3c comprises means for heating the support 1 and for maintaining it at a given temperature.

The electrode 3 thus comprises patterns 4 defining a structuring over a zone intended to be applied on a surface of a support made of amorphous material. In the case of FIG. 2A, the zones are lines 4 of a same width. The patterns may be produced by different techniques: by the formation of discontinuities of a conducting zone or by a geometry defined by alternations of conducting zones and non-conducting zones.

According to one embodiment, the electrode is dimensioned to inscribe, on a surface of a support, second order non-linear optical properties over a given portion. In this case, the electrode and its structuring are dimensioned so as to cover a portion of the support.

An exemplary embodiment of an electrode of the invention may be obtained by the formation on its surface of a thin layer of indium-tin oxide (ITO). This thin layer makes it possible to obtain good electrical conductivity properties. A layer of a thickness of 100 nm may be formed on the surface of the electrode. According to other embodiment alternatives, the thickness may be from several nanometers to several thousands of nanometers.

The thin layer of ITO is deposited on an electrically insulating substrate. The patterns forming the structuring of the electrode may be produced by ablation of portions of the thin layer of ITO allowing certain zones of insulating substrate to be revealed. The structuring is said to be obtained "by ablation" to define a given geometry.

According to one example, an alternation of lines of insulating substrate and conducting lines may form a geometry defining a structuring of the electrode. This electrode is named the test electrode.

Heating of the Support

The inscription method comprises a step of heating an amorphous support within a temperature range allowing the movement of charges inside said support under the effect of the application of an electrical field. This step is noted AUG_TEMP in FIG. 1. According to one field of application of the invention, the temperature of the support may be raised within a wide range from 50° C. to 500° C. depending on the chosen applications. The temperature must preferentially be below the glass transition temperature of the support when this temperature exists.

According to one exemplary embodiment, the temperature of the support may be advantageously designed from 100° C. to 300° C. The selected temperature depends notably on the material, the geometry of the support and the density of cations in the support.

The raising of temperature makes it possible to improve the mobility of the cations under the effect of an electrical field that is applied by means of an electrode.

A configuration table, such as an abacus, may be used to configure the temperature as a function of the support, its geometry and the density of cations in the support. The raising of the temperature enables heating of the support to a desired temperature favouring the migration of cations in the amorphous material under the application of an electrical field. The step of application of an electrical field by means of a structured electrode is then carried out at the heating temperature, which is maintained throughout the method.

FIG. 2B represents an amorphous support 1 on which an electrode 3 is maintained in contact. Second order non-linear optical properties are inscribed on the support 1 from a structured electrode 3 by means of the method of the invention. A thermometer THER is capable of measuring the temperature of the support 1 which is heated by means of a component CHAU. The component CHAU may be designed so as to raise the temperature of the support 1 and to maintain it at a set temperature. A power supply PSU is represented to supply the electrode 3 with voltage.

Application of an Electrical Field

The inscription method of the invention comprises the application of a structured electrode 3 on an amorphous support to generate an electrical field inducing localised accumulations of charges. This step is noted APP_CHMP in FIG. 1.

The electrode 3 may be applied by contact on the support. The contact may be maintained thanks to a mechanical pressure applied to the electrode 3 and to the support 1. In this case, the electrode 3 is applied as a buffer on the support for a predefined duration. According to another embodiment, it may be applied near to the surface of the support 1. In the latter case, the electrode 3 may be maintained at a distance of several micrometers from the support. A plasma may be used to form a conducting interface between the electrode and the support. According to other embodiments, a conducting interface may be arranged between the electrode and the support.

The duration of application of the field and its intensity are designed as a function:
of the voltage applied to the electrode, the type of electrode, the intensity of the electrical field generated and the structuring of the electrode and/or;
of the type of amorphous material used, the density of cations in the material and/or;
of the temperature applied.

According to one embodiment, a voltage applied to the electrode 3 may be comprised between 0.5V and 5 kV. According to a more general embodiment of the invention, the voltage may be comprised in ranges of values greater than and less than the range 0.5V and 5 kV, the power and the amperage being adapted to the application. Notably, the type of electrode and the structuring impose a generated electrical field which may be driven by a voltage applied to the electrode.

According to one example, when the electrode is structured thanks to thin layers of ITO by ablation, a voltage of 1.5 kV at a temperature of 230° C. may be defined. The thickness of the layer may be of the order for example of one hundred or so nanometers. These voltage and temperature application conditions are called the test conditions.

In the case of an electrode structured by a spatial alternation of conducting zones and non-conducting zones, the accumulation of charges takes place by edge effect on the surface of the electrode during the application of a voltage. The edges are defined by the junction of non-conducting zones and conducting zones. In the case of a layer of ITO covering an insulating substrate on a portion of its surface, the edge effect takes place at the limit of the two zones.

Inscription, Cooling

During the application of the electrode on the support 1, the material is polarised under the effect of the electrical field at a given temperature allowing the circulation of cations in the material. The electrical field applied thanks to the electrode favours the creation of an anisotropy which may be linked to the presence of a space charge or to a reorganisation of the structure or instead a combination of these two effects. The anisotropy induces the creation of second order non-linear optical properties in the amorphous material. The generation of anisotropy in the material is controlled thanks to the structuring of the electrode. The printing makes it possible as it were to "freeze" the migration of cations under the application of an electrical field maintained during the cooling of the support.

The inscription method is carried out for a predefined duration which enables the formation of non-linear optical effects and ends by the cooling of the support, for example, to ambient temperature. This latter step is noted DIM_TEMP in FIG. 1. The cooling of the support is carried out under stress, that is to say while maintaining active the electrical field of the electrode and while maintaining the electrode in contact with the support. The contact may be assured, for example, by maintaining a mechanical pressure between the electrode and the support. Under-stress cooling makes it possible to block the diffusion of cations and enables the polarisation of the support during the cooling phase. Thus, cooling makes it possible to freeze the effect of printing of the support.

The cooling may be assured by a cold source. According to one exemplary embodiment, the cold source may be assured by the component CHAU supplying heat.

Exemplary Embodiment, Test

FIG. 2B illustrates an example of a test support, a test electrode in test conditions which have been defined beforehand.

The glass support 1 comprises lines 2 which are formed on its surface after the application of the electrode 3 of FIG. 2A according to the method of the invention.

An optical microscope makes it possible to characterise the anisotropy obtained from second harmonic generation measurements, of which the method is known under the acronym SHG. Second harmonic generation is proof of observation that a second order non-linear optical property has been inscribed on the surface of the amorphous support 1.

Localisation of the Anisotropy

FIG. 3A represents a support made of amorphous material on which lines 2 have been inscribed thanks to the method of the invention. In this case, an electrode 3 has been used comprising another structuring than the electrode of FIG. 2A which has lines of constant thickness. In the case of FIG. 3A, a structured electrode with lines of different widths has been used.

In FIG. 3B may be seen maximums observed from the SHG response of a laser polarised along the y axis as a function of the width of the lines 2 inscribed on the support 1 of FIG. 3A. It may be observed that the maximums are present at the edge of the lines. The edge effect makes it possible to generate localised accumulations of charges and makes it possible to inscribe spatially non-linear optical properties along lines organised in the material.

The polarisation treatment effect is induced on each edge of line, the distance between two maximums increasing with the thickness of the lines 2 inscribed by the structured electrode 3. FIG. 3A represent four examples of structuring of lines having widths of 1 µm, 3 µm, 7 µm and 9 µm and corresponding to the SHG response results obtained of FIG. 3B.

Geometry of the Anisotropy

Figure 4B:
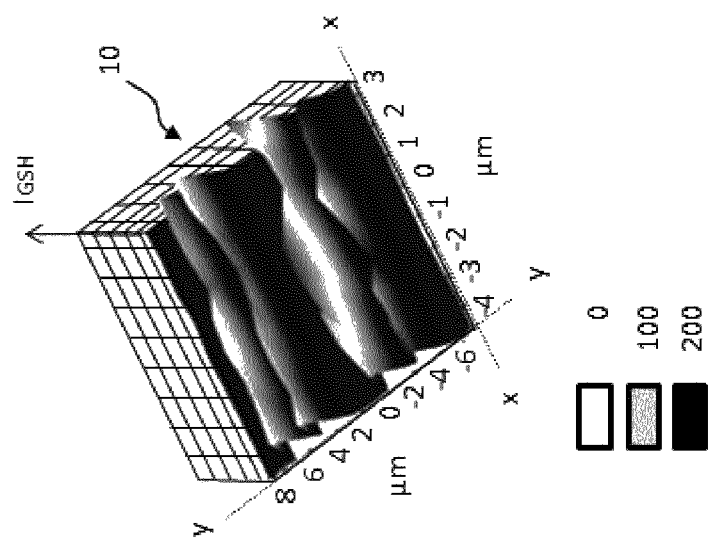
FIG. 4B: a three-dimensional representation of a SHG response to a laser polarised along one dimension of a support printed from the method of the invention.
Figure 4A:
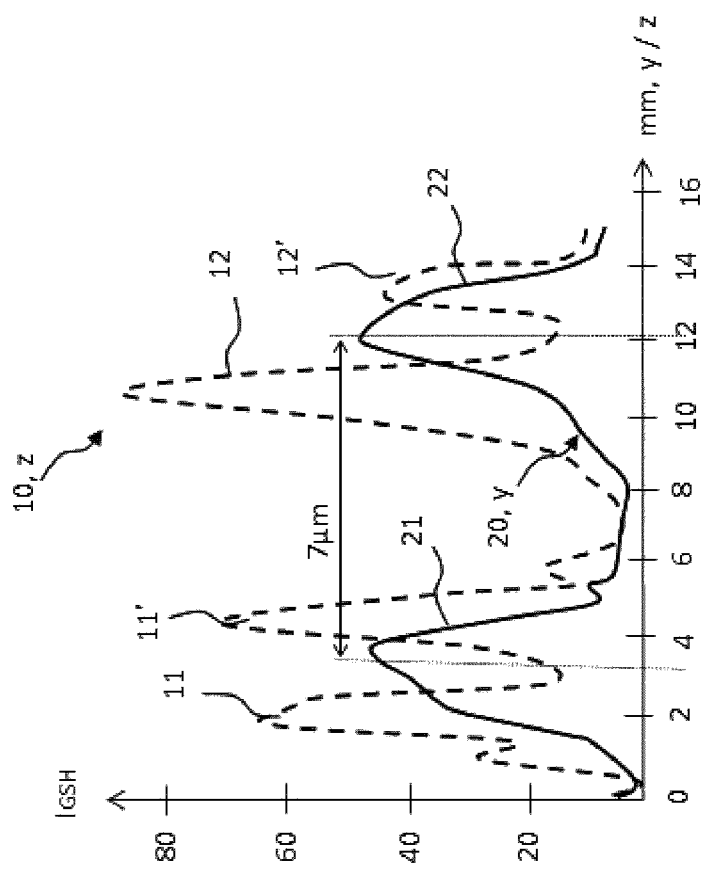
FIG. 4A: a response of a SHG signal confirming the inscription of second order non-linear optical properties on a support made of amorphous material.

FIG. 4A represents a characterisation of the geometry of the SHG response of a laser polarised along the z axis by the curve 10 and polarised along the y axis by the curve 20 when a line has been inscribed on a support. The two components y and z observed are orthogonal to each other. The components x and y are comprised in the plane of the surface of the glass support, the component z is orthogonal on the surface of the glass support. The component y is perpendicular to the line formed by inscription according to the method of the invention.

Along the z polarisation, on each edge of the line observed, may be distinguished two maximums 11, 11' and 12, 12' of the SHG response. These two maximums are compliant with the three-dimensional representation of FIG. 4B. The three-dimensional figure of FIG. 4B illustrates the SHG response of the polarisation along z of curve 10 of FIG. 4A.

Along the y polarisation, a maximum 21 and 22 may be distinguished on each edge of the line observed. No signal is measured in this example along the x axis. It will be understood that the maximums of the SHG response are obtained on each edge of a line of a width of 8 to 9 µm and all along these edges, the measurement is carried out from the y axis perpendicular to the line.

FIG. 4B gives a three-dimensional representation of a SHG response when the analysis of an inscribed line is carried out along the z polarisation. The formation of an anisotropy which characterises the geometry of the optical properties inscribed in the glass may be distinguished. The anisotropy 10 along the z polarisation is formed perpendicular to the surface of the glass. In this exemplary embodiment, the second order non-linear optical response has two maximums localised on each edge of the line analysed along said axis. Along the y axis, it may be distinguished that the curves extend slightly along the y axis.

Along the polarisation of the signals emitted by the optical microscope, it is possible to visualise on each axis the generation of the second harmonic. In the example of FIG. 4A, there is no generation of second harmonic along the x axis or this is considered as negligible.

Homogeneity of the Anisotropy

The method of the invention thus makes it possible to control the anisotropy created thanks to the structured electrode 3. One advantage is to make it possible to control the localisation and the geometry of the anisotropy but also its homogeneity. "Homogeneity of the anisotropy" is taken to mean the level obtained of the SHG response along the axis observed when it is comprised in a given interval of values. The homogeneity is thus characterised by a quantification of the SHG response in a given interval of values. In FIG. 4B, it may be observed that the levels of the maximums are substantially constant in the direction of the anisotropy. This is then referred to as homogeneous anisotropy.

The method of the invention assures a substantially homogeneous distribution of non-linear optical properties along one direction. This may be the case over two dimensions, or even three dimensions according to the geometry of the anisotropy that has been inscribed in the amorphous material.

One advantage is to configure the structuring of the electrode to obtain a desired quantification of SHG response along each of the axes making it possible to define homogeneous second order non-linear optical properties along one given axis of the anisotropy.

Periodicity of the Anisotropy

Figure 5B:
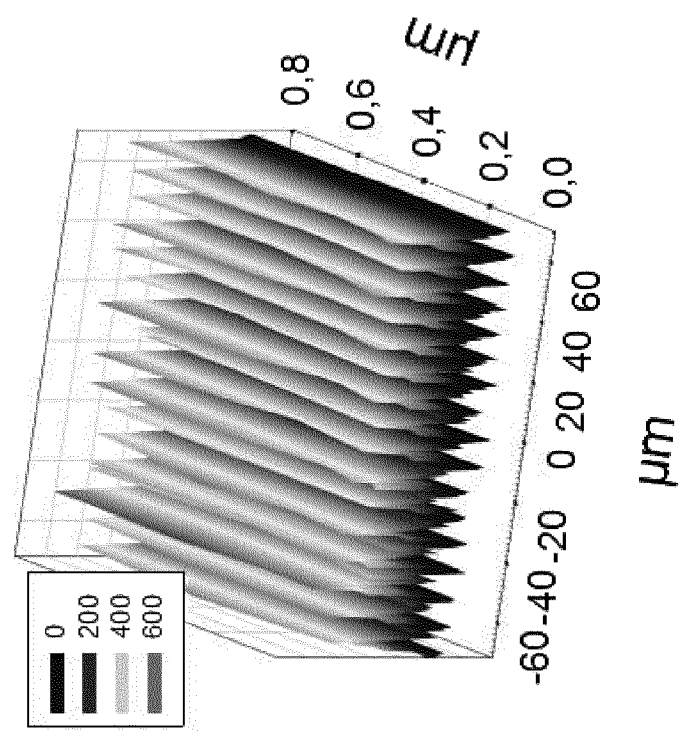
FIG. 5B: a three-dimensional representation of a SHG response to a laser polarised along one dimension of a printed support of FIG. 5A.
Figure 5A:
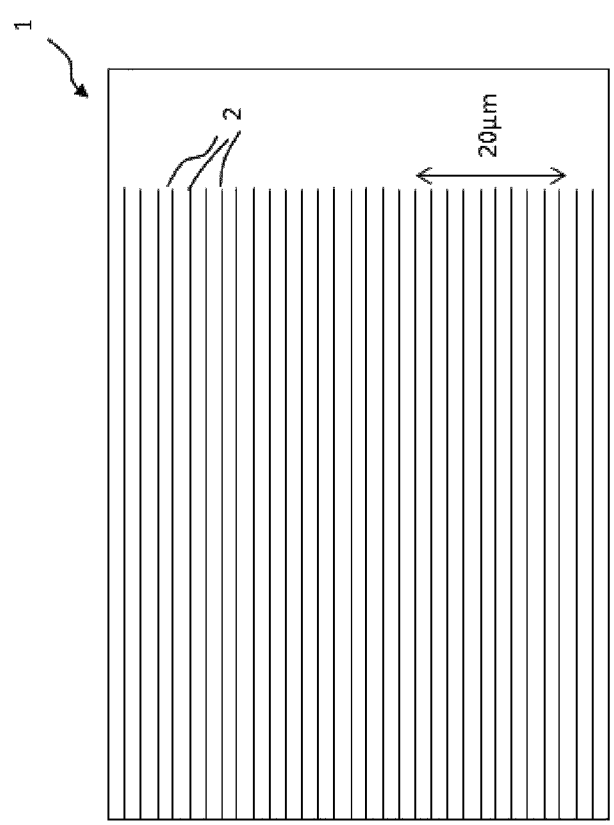
FIG. 5A: an inscription of micrometric lines comprising non-linear optical properties according to the method of the invention.

FIG. 5A represents an example of support 1 of several square millimeters, in this example: on a surface of 4 mm$^2$, on which a plurality of lines of a width of several micrometers have been inscribed from a structured electrode 3. According to one example, the structuring is formed by set of lines of 2 µm width and 2 mm length. The structuring is referred to as micrometric. In this example, the periodic structuring at the micrometric scale of the electrode 3 makes it possible to inscribe at this same scale second order non-linear optical properties on an amorphous support.

FIG. 5B gives a three-dimensional representation of a SHG response when the analysis is carried out along the z polarisation of a plurality of inscribed lines of same width and all substantially parallel. The formation of a periodic repetition of the anisotropy which characterises the geometry of the optical properties inscribed in the glass may be distinguished. In this example, the geometry of the anisotropies may be obtained along the y axis and the z axis, as in the case of FIG. 4A.

This example makes it possible to illustrate an interesting case of optical properties organised on the surface of a support to meet a given application such as a frequency converter.

According to another test, a square of ITO of 50 μm sides on an insulating substrate is considered. The SHG signal induced and measured with a linear polarisation of the laser along the y axis of an optical microscope is observable on the edge of the structuring, that is to say at the limit between the insulating substrate and the conducting zone. When a voltage is applied to the electrode it is observed that the accumulation of charges takes place on the edge with a measuring polarisation along the x axis.

This second test demonstrates that the control of the polarisation may be carried out by the control of the accumulation of charges in certain zones and according to certain geometries. It is then possible thanks to the method of the invention to control the localisation and the orientation of the anisotropy induced on the surface of an amorphous support.

The method of the invention thus enables a printing type treatment under thermal and electrical stress.

The printing makes it possible to control spatially and geometrically, along the three axes, an induced anisotropy which governs the second order non-linear optical properties of a printed support.

Advantageously, an electrode of the invention is designed specially for the printing of an amorphous support. The design choices are based notably on an ability to operate within temperature ranges going up to 300° C., and even more. Furthermore, the electrode 3 is designed to avoid causing any damage to the amorphous support 1 notably by mechanical pressure exerted as well as by its geometry. The chemical nature of the electrode 3 may also be designed to avoid causing an electrochemical reaction between the electrode and the support. A configuration in which a chemical neutrality between the electrode and the materials is chosen is then favoured.

Applications

The invention has an interest and numerous advantages in the field of microphotonics for the production, for example, of electro-optical components or wavelength converters. This type of application usually requires a phase matching or quasi-phase matching condition of the interfering waves in the medium. To meet this condition, the spatial structuring inscribed in the medium must be of an order of magnitude of around a micrometer. The method of the invention makes it possible to obtain such a precision in the non-linear optical properties inscribed in the material and thus responds perfectly to this requirement.

For a frequency converter, the interline distance of the patterns to inscribe on an amorphous support is designed on the structured electrode 3 as a function of a given wavelength and a material index. The amorphous material may thus be printed to enable quasi-phase matching during the frequency conversion when it is designed to frequency convert an incident optical signal.

Different types of patterns may be inscribed on an amorphous material from the method of the invention, such as curves, lines, or any pattern of which at least one dimension is of micrometric order ranging for example from 0.1 μm to 100 μm.

One advantage of inscribing non-linear optical properties in amorphous materials is to reduce costs. Furthermore, amorphous materials offer better optical compatibility with optical fibres for example.

One advantage of the invention is to have available a totally reusable electrode because no ion transfer takes place on the support. It thus conserves its structuring after the application of the method of the invention. One advantage vis-à-vis solutions in which there is ion transfer, such as transfer from a structured silver layer on a support, is that the structuring of the electrode remains conserved after its use. One advantage is to enable a reuse to inscribe other optical properties on other supports.

Indeed, certain solutions of the prior art make it possible to inscribe non-linear optical properties by transfer from a structured layer, in this case it is the ionised layer that is structured. After the inscription method of such solutions, the electrode no longer has structuring and thus cannot be reused, which represents a drawback.

Finally, certain solutions of the prior art make it possible to inscribe non-linear optical properties on polymer organic materials comprising molecules of interest for non-linear optics.

In this case, for an organic material the electrical field brings about a molecular orientation. The molecules of interest for non-linear optics may be considered as dipoles which align with each other under the effect of the electrical field and bring about the necessary anisotropy.

On the other hand, according to the method of the invention which applies to an amorphous material such as glass, the polarisation treatment induces a space charge within the material. This space charge is at the origin of a permanent static electrical field in the vitreous matrix, the anisotropy and the non-linear optical properties are then of electro-optical nature.

One advantage of the invention vis-à-vis inscription on an organic material of polymer type is that the ranges of voltages used of the invention are much higher that the damage threshold of that of a support made of organic material for a polarisation treatment in contact, notably with a polymer organic material.

According to one embodiment, the voltage is defined so as to generate an electrical field comprised in the range [0.7 kV/mm; 5 kV/mm].

The invention claimed is:

1. A method for inscription of second order non-linear optical properties on a support comprising an inorganic amorphous material, the method comprising:
   heating the support within a temperature range allowing a movement of charges inside said support;
   applying a structured electrode to said support generating an electrical field configured to induce a localised accumulation of electrical charges in at least one first zone of the surface of said structured electrode when said structured electrode is supplied by a voltage, said localised accumulation of charges generating at least one anisotropy structuring a second zone of the support in the form of non-linear optical properties inscribed on the surface of said support;
   cooling the support under the application of the electrical field generated and maintained for a predetermined duration by the application of the structured electrode.

2. The method according to claim 1, wherein the anisotropy formed in the support comprises a controlled geometry and localisation in the second zone of the support.

3. The method according to claim 2, wherein the anisotropy formed in the support is homogeneous along at least one direction of the second zone of the support.

4. The method according to claim 1, wherein the accumulation of charges is induced in at least one first zone of the surface of the structured electrode by one of the following effects:
   an edge effect;
   a peak effect;
   a confinement effect.

5. The method according to claim 1 wherein a structuring of the structured electrode is configured to create an anisotropy inducing a localised distribution of second order non-linear optical properties in the second zone of the support.

6. The method according to claim 1, wherein the first zone and/or the second zone have at least one length that is less than 100 µm.

7. The method according to claim 1, wherein the structured electrode comprises an electrically conducting material comprising at least one geometric discontinuity.

8. The method according to claim 7, wherein the at least one geometric discontinuity is a confinement or a peak on the surface of the structured electrode.

9. The method according to claim 1, wherein the structured electrode comprises spatial alternations between at least one electrically conducting material and at least one electrically non-conducting material.

10. The method according to claim 9, wherein an edge effect is induced on the structured electrode comprising at least one junction between the at least one electrically conducting material and the at least one electrically non-conducting material.

11. The method according to claim 9, wherein the structured electrode comprises a thin layer of an electric conductor superimposed on a layer of an insulating substrate.

12. The method according to claim 1, wherein the voltage is set to generate an electrical field comprised in the following range from 0.7 kV/mm to 5 kV/mm.

* * * * *